(12) United States Patent
Gharibian et al.

(10) Patent No.: US 6,568,906 B2
(45) Date of Patent: May 27, 2003

(54) CONFORMAL SLIDING BEARING

(75) Inventors: Simon J. Gharibian, New Haven, CT (US); David H. Hunter, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/841,676

(22) Filed: Apr. 24, 2001

(65) Prior Publication Data

US 2002/0154998 A1 Oct. 24, 2002

(51) Int. Cl.$^7$ ............................................... B64C 11/28
(52) U.S. Cl. ........................................... 416/88; 384/42
(58) Field of Search ........................ 416/87, 88, 210 R, 416/226; 384/42, 26

(56) References Cited

U.S. PATENT DOCUMENTS

| | | | | |
|---|---|---|---|---|
| 3,995,916 A | * | 12/1976 | Lange et al. | ................. 308/6 C |
| 4,114,945 A | * | 9/1978 | Lutz | ...................... 296/137 E |
| 4,518,205 A | * | 5/1985 | Heathe | ........................ 308/3 R |
| 4,564,247 A | * | 1/1986 | Knoop | ........................... 384/19 |
| 5,378,129 A | * | 1/1995 | Dunaevsky et al. | ....... 418/55.5 |
| 5,518,318 A | * | 5/1996 | Orndorff, Jr. | ................. 384/98 |
| 5,642,982 A | * | 7/1997 | Matuska et al. | ............... 416/87 |
| 5,671,988 A | * | 9/1997 | O'Neil | ................... 312/334.44 |
| 5,875,562 A | * | 3/1999 | Fogarty | ........................... 34/97 |
| 5,897,119 A | * | 4/1999 | McMillen | ................... 277/562 |
| 6,286,264 B1 | * | 9/2001 | Peuler | ............................. 52/6 |

* cited by examiner

*Primary Examiner*—Ninh H. Nguyen
(74) *Attorney, Agent, or Firm*—Carlson, Gaskey & Olds

(57) ABSTRACT

A conformal bearing assembly includes an bearing housing, an elastomeric member and a bearing element. The bearing assembly is mounted between and inner and outer telescopic member. The elastomeric member allows the bearing element to substantially conform to the adjacent telescopic member irrespective of minor manufacturing inconsistencies along the adjacent telescopic member. Contact pressure between the bearing element and the adjacent telescopic member is thereby more evenly distributed which minimizes regions of interference and or clearance which may otherwise result in undesirable wear characteristics of the telescopic system.

31 Claims, 3 Drawing Sheets

CONFORMAL SLIDING BEARING

BACKGROUND OF THE INVENTION

This invention was made with government support under Contract No.: DABT63-99-3-0002 awarded by the Department of the Army. The government therefore has certain rights in this invention.

The present invention relates to a conformal bearing assembly, and more particularly to a conformal bearing assembly having a resilient elastomeric member which compensates for tolerance variations between telescopic members.

A telescopic system often includes a bearing assembly between an outer telescopic member and an inner telescopic member. The outer telescopic member extends and retracts relative to the inner telescopic member upon the bearing assembly. Contact pressure is thereby developed between the bearing and the mating surface of the inner telescopic member. To provide effective relative translation between the inner and outer telescopic members, the inner telescopic member must be manufactured to provide a consistent uniform bearing mating surface.

Conformity of mating surface of the inner telescopic member directly influences the wear characteristics of the bearing. In some instances, the contact region between the bearing and the mating surface results in an interference condition. High pressures at the interference causes accelerated wear upon the bearing and mating surface which may result in an increase in the magnitude of force required to translate the telescopic members. Conversely, a clearance condition may exist between the bearing and the mating surface. High edge pressure upon the bearing may thereby be caused as the bearing transmits relative bending moment between the inner and outer telescopic member. Furthermore, the clearance may increase undesirable relative motion between the inner and outer telescopic members.

Accordingly, it is desirable to provide a conformal bearing assembly which compensates for tolerance variations between telescopic members.

SUMMARY OF THE INVENTION

The conformal bearing assembly according to the present invention includes a bearing housing, an elastomeric member and a bearing element. The bearing assembly is mounted between an inner and outer telescopic member. The bearing housing is preferably non-linear in cross-section which corresponds to the bearing surface of the adjacent telescopic member.

The elastomeric member allows the bearing element to substantially conform to the adjacent telescopic member irrespective of minor manufacturing inconsistencies along the adjacent telescopic member. Contact pressure between the bearing element and the adjacent telescopic member is thereby more evenly distributed which minimizes regions of interference and or clearance which may otherwise result in undesirable wear characteristics of the telescopic system.

In one embodiment, the conformal bearing assembly allows flapwise, edgewise, and other torsional moments to be transferable through the conformal bearing assembly and provides an additional degree of freedom for a variable diameter rotor blade assembly. The possibility of binding between the outboard rotor blade section and the torque tube is also thereby minimized while manufacturing tolerance envelopes of the telescopic members are increased.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
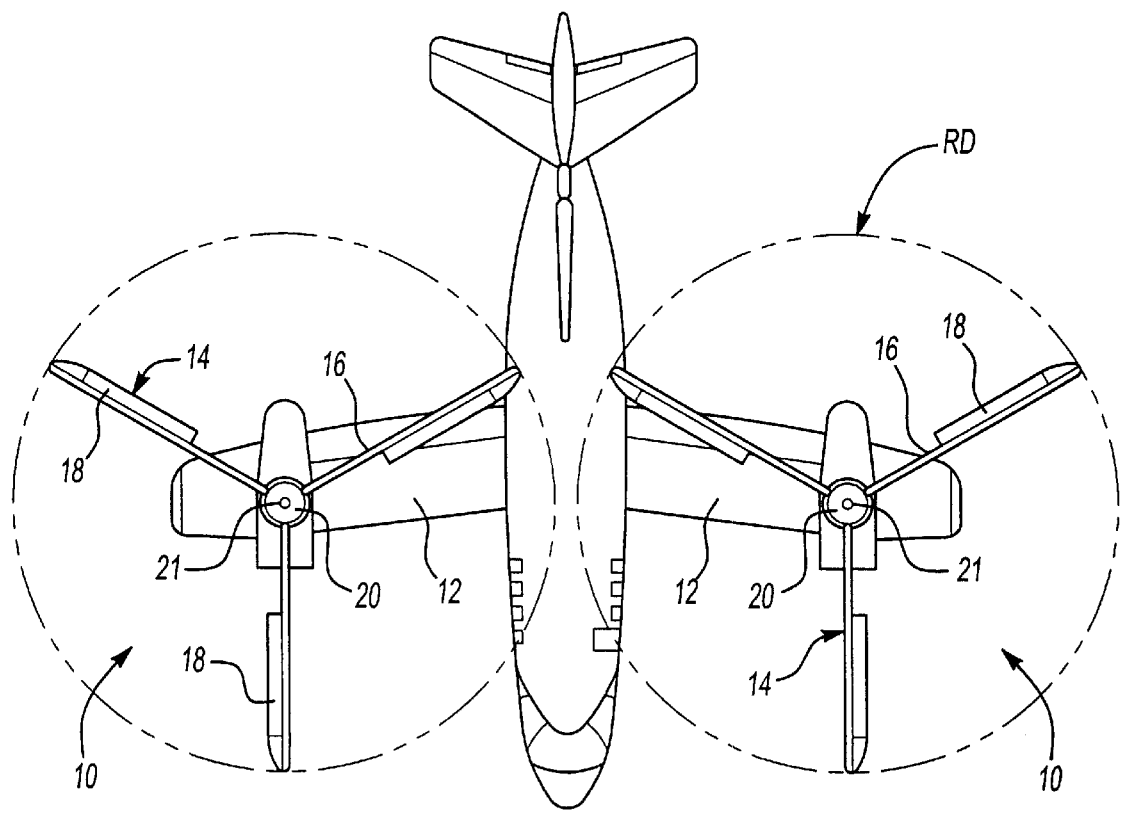
FIG. 1A is a plan view of a tilt-rotor aircraft illustrating the variable diameter rotor system according to the present invention in its horizontal position.
Figure 1B:
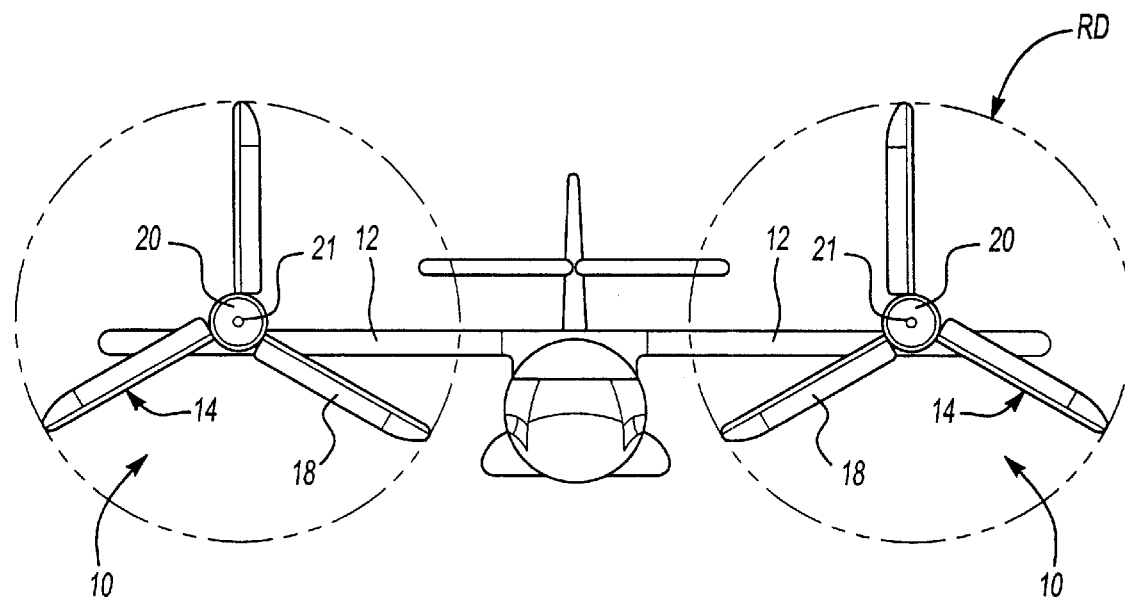
FIG. 1B is a front view of a tilt-rotor aircraft illustrating the variable diameter rotor system according to the present invention in its vertical position.

FIG. 1 illustrates a tilt rotor aircraft that includes a pair of variable diameter rotor blade (VDR) systems 10. The VDR systems 10 are shown pivotally mounted on laterally extending wing sections 12 of an aircraft. The VDR systems 10 are pivotable between a horizontal or hover flight position, shown in FIG. 1A, and a vertical or forward flight position, shown in FIG. 1B.

Each VDR system 10 includes a plurality of variable diameter rotor blade assemblies 14 which are capable of being extended and retracted to vary the size of the rotor diameter (RD) as required. In order to effectuate the change in diameter, the variable diameter rotor blade assemblies 14 include an inboard rotor blade section 16 and a global outboard rotor blade section 18 which telescopes relative to the inboard rotor blade section 16. The VDR blade assembly 16 is mounted to and driven by a rotor hub assembly 20 about an axis of rotation 21.

Figure 2:
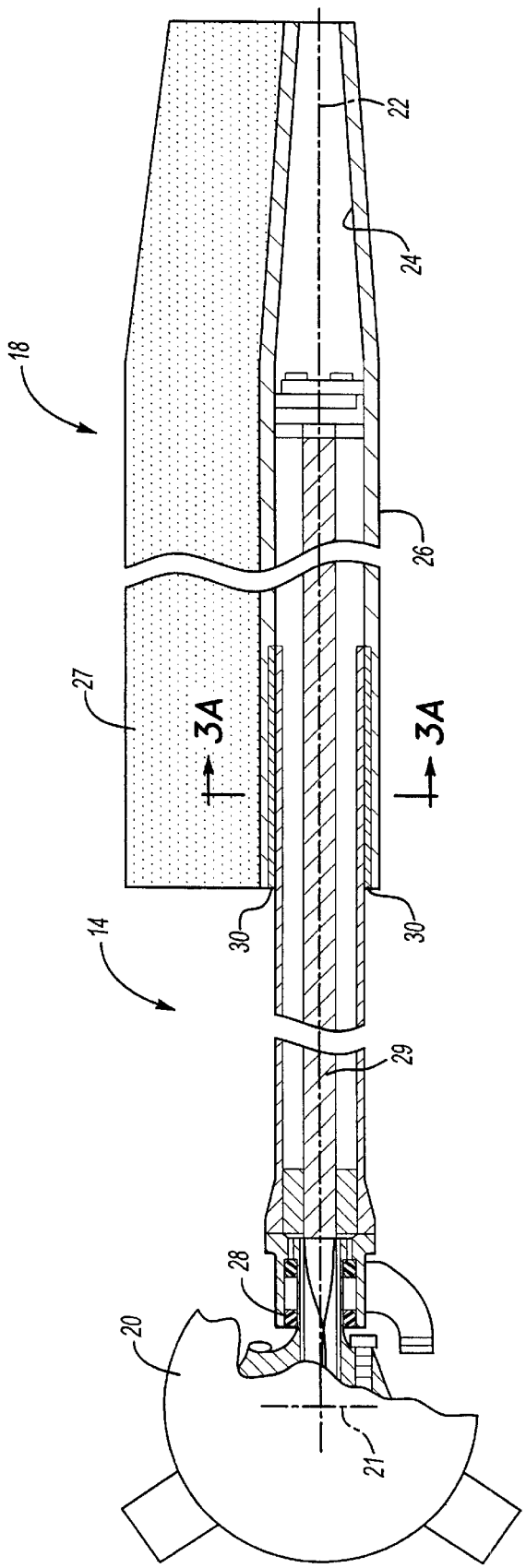
FIG. 2 is an expanded view of a Variable Daimeter rotor blade assembly having a conformal bearing according to the present invention.

Referring to FIG. 2, each VDR blade assembly 14 includes the movable outboard rotor blade section 18 which telescopes relative the inboard rotor blade section 16 (hereinafter referred to as a torque tube) along a longitudinal axis 22. The outboard rotor blade section 18 includes a hollow spar member 24 which is enveloped by a leading edge 26 and a trailing edge 27 to define the requisite aerodynamic contour of the outboard rotor blade section 18. The spar member 24 and the outboard rotor blade section 18 coaxially accepts the torque tube 16 to permit relative telescopic translation thereof. The VDR blade assembly 14 is telescopic by a drive system 28 having a retractable and extendable drive member 29 or the like attached to the outboard rotor blade section 18.

Coaxial alignment and telescopic motion of the outboard rotor blade section 18 relative to the torque tube 16 is effected by a conformal bearing assembly 30 according to the present invention. The conformal bearing assembly 30 provides a degree of freedom to each VDR blade assembly 14 allowing effective sliding motion therebetween. As will be further described, the conformal bearing assembly 30 provides sufficient relative movement between the outboard rotor blade section 18 and the torque tube 16 to accommodate typical manufacturing tolerances. It should be understood that although a VDR blade assembly is illustrated in the disclosed embodiment, other telescopically related members will benefit from the present invention.

Figure 3:
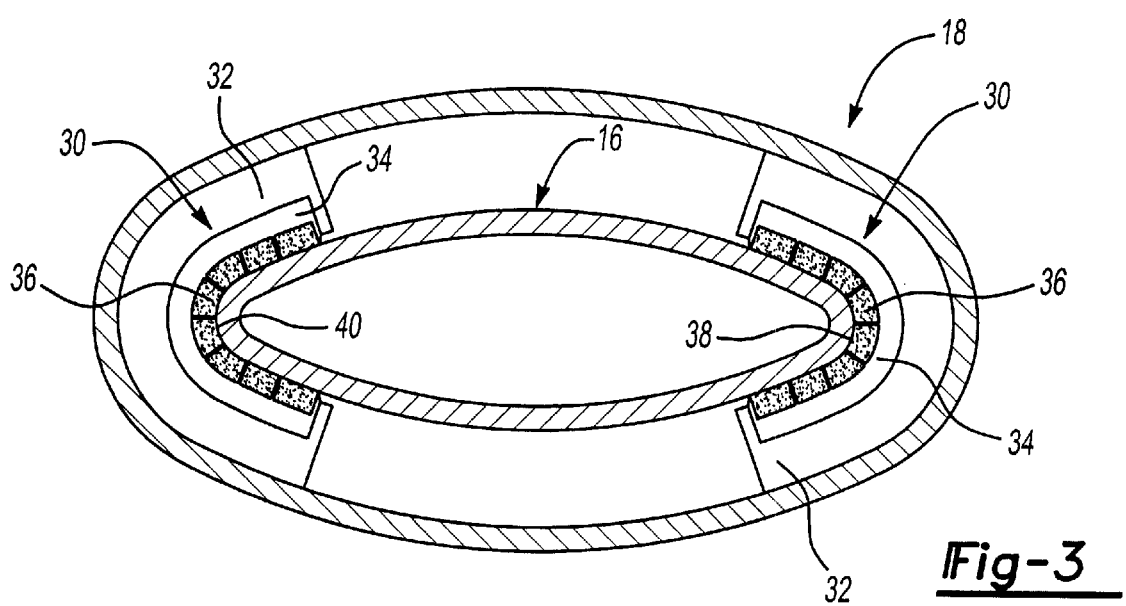
FIG. 3 is a sectional view of the rotor blade of FIG. 2 taken along the line 3A—3A.

Referring to FIG. 3A, the conformal bearing assembly 30 includes a support structure such as a bearing housing 32, an elastomeric member 34 and a bearing element 36. Preferably, the conformal bearing assembly 30 is mounted within the outboard rotor blade section 18 adjacent the leading edge 38 of the torque tube 16 and the trailing edge 40 of the torque tube 18. However, it should be understood that other positions will benefit from the present invention. The bearing assembly 30 preferably extends parallel to the longitudinal axis 22 for a length in which the outboard rotor blade section 18 overlaps the torque tube 16 in the extended position (FIG. 2).

The bearing housing 32 is preferably non-linear in cross-section and corresponds to the inner surface of the outer telescopic member such as the outboard rotor blade section 18. The bearing housing provides a mounting surface which stabilizes the elastomeric member 34.

The elastomeric member 34 provides a resilient and conformal mount for the bearing element 36. The elastomeric member is preferably thin enough not to significantly decrease the stiffness of the bearing assembly while under the influence of flapwise, edgewise and torsional moment loadings while having a thickness which provides the appropriate geometry to mount the bearing element to provide a resilient and conformal mount for the bearing element 36. The elastomeric member 34 is preferably an elastomer material such as that produced by Lord Corporation, 111 Lord Drive, PO Box 8012, Cary, N.C. 27512 under the trade name SPE®.

Preferably, the bearing element 36 includes a non-moving element mounted into the elastomeric member 34. The bearing element 36 is preferably a metallic substrate having a low friction coating to assure a substantially friction free sliding contact with the torque tube 16. In one embodiment, a titanium substrate is coated with a Teflon material and embedded into the elastomeric member 34. In another embodiment, a bearing system such as that produced by Kaman Corporation, 1332 Blue Hills Avenue, Bloomfield, Conn. 06002, under the trade name KAron® is embedded into the elastomeric member 34. The bearing element preferably rides along a nickel contact surface of the torque tube 16 to further minimize friction. Alternatively or in addition, other bearing systems and contact surfaces will benefit from the present invention.

The elastomeric member 34 provides a resilient interface between the bearing housing 32 and the bearing element 36 such that the outboard rotor blade section 18 is easily movable relative to the torque tube 16. The elastomeric member 34 allows the bearing element 36 to substantially conform to the torque tube 16 irrespective of minor manufacturing inconsistencies along the torque tube 16. Contact pressure between the bearing element 36 and the torque tube 16 is thereby more evenly distributed which minimizes regions of interference and or clearance which may otherwise result in undesirable wear characteristics of the system.

Flapwise, edgewise, and other torsional moments are transferable through the conformal bearing assembly 30 which provides an additional degree of freedom to the VDR blade assembly 14. The possibility of binding between the outboard rotor blade section 18 and the torque tube 16 is also thereby minimized while manufacturing tolerance envelopes of the telescopic members are increased.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A conformal bearing assembly for an aerodynamic member comprising:
   a bearing housing mounted to an inner surface of a first member, said first member completely surrounds a second member in cross-section;
   an elastomeric member attached to said bearing housing; and
   a metallic bearing element at least partially embedded within said elastomeric member such that said metallic bearing element contacts said second member.

2. The conformal bearing assembly as recited in claim 1, wherein said bearing element includes a low friction bearing element.

3. The conformal bearing assembly as recited in claim 1, wherein said bearing element includes a low friction coating.

4. The conformal bearing assembly as recited in claim 1, wherein said bearing housing is non-linear in cross section.

5. The conformal bearing assembly as recited in claim 1, wherein said elastomeric member defines a pocket to receive said bearing element.

6. The conformal bearing assembly as recited in claim 5, wherein said bearing element conforms to said pocket.

7. The conformal bearing assembly as recited in claim 1, wherein said bearing element slidably engages a torque tube of a variable diameter rotor system.

8. The conformal bearing assembly as recited in claim 1, wherein said bearing housing is mounted to a first member such that said bearing element slides along a second member.

9. The conformal bearing assembly as recited in claim 8, wherein said bearing element maintains constant sliding contact with said second member throughout movement of said second member relative to said first member.

10. The conformal bearing assembly as recited in claim 9, further comprising a plurality of said bearing elements arranged at least partially around a longitudinal axis defined by said second member.

11. A conformal bearing assembly for a rotor blade comprising:
    a first member telescopically mountable to a second member;
    a bearing housing mounted within said first member;
    an elastomeric member attached to said bearing housing; and
    a bearing element mounted to said elastomeric member such that said bearing element is movable along said second member, said elastomeric member providing a compliant interface between said bearing housing and said bearing element such that said bearing element substantially conforms to said second member.

12. The conformal bearing assembly as recited in claim 11, wherein said bearing element includes a low friction bearing element.

13. The conformal bearing assembly as recited in claim 11, wherein said bearing element includes a low friction coating.

14. The conformal bearing assembly as recited in claim 11, wherein said bearing housing is semi-elliptical in cross section.

15. The conformal bearing assembly as recited in claim 11, wherein said elastomeric member defines a pocket to receive said bearing element.

16. The conformal bearing assembly as recited in claim 11, wherein said bearing element slidably engages said second member.

17. The conformal bearing assembly as recited in claim 11, wherein said second member is at least partially elliptical in cross-section.

18. A variable diameter rotor system comprising:
   an outboard rotor blade section telescopically mountable relative to an inboard rotor blade section;
   a non-linear bearing housing mounted within said outboard rotor blade section;
   an elastomeric member attached to said bearing housing; and
   a bearing element mounted to said elastomeric member such that said bearing element is movable along said second member, said elastomeric member providing a compliant interface between said bearing housing and said bearing element such that said bearing element substantially conforms to said second member.

19. The variable diameter rotor system as recited in claim 18, wherein said bearing housing conforms to an interior contour of said outboard rotor blade section.

20. The variable diameter rotor system as recited in claim 18, wherein said bearing element includes a low friction bearing element.

21. The variable diameter rotor system as recited in claim 18, wherein said bearing element slidably engages said inboard rotor blade section.

22. The variable diameter rotor system as recited in claim 18, wherein said inboard rotor blade section includes a torque tube.

23. The variable diameter rotor system as recited in claim 22, wherein said torque tube is substantially elliptical in cross-section.

24. The variable diameter rotor system as recited in claim 22, wherein said torque tube is substantially airfoil shaped in cross-section.

25. A conformal bearing assembly comprising:
   a bearing housing;
   an elastomeric member attached to said bearing housing; and
   a bearing element mounted to said elastomeric member, said bearing element slidably engages a torque tube of a variable diameter rotor system.

26. A conformal bearing assembly for a telescopic assembly comprising:
   a first member telescopically mountable to a second member said first member comprises a rotor blade section and said second member comprises a torque tube;
   an bearing housing mounted within said first member;
   an elastomeric member attached to said bearing housing; and
   a bearing element mounted to said elastomeric member such that said bearing element is movable along said second member, said elastomeric member providing a compliant interface between said bearing housing and said bearing element such that said bearing element substantially conforms to said second member.

27. A conformal bearing assembly for an aerodynamic member comprising:
   a bearing housing mounted to a first member said bearing housing conforms to an interior contour of a rotor blade component;
   a bearing element engageable with a second member; and
   an elastomeric member mounted between said bearing housing and said bearing element.

28. A conformal bearing assembly for an aerodynamic member comprising:
   a bearing housing mounted to a first member;
   a bearing element engageable with a second member, said bearing element conforms to an interior contour of a rotor blade component; and
   an elastomeric member mounted between said bearing housing and said bearing element.

29. A conformal bearing assembly for an aerodynamic member comprising:
   a bearing housing mounted to a first member said bearing housing conforms to an exterior contour of a rotor blade component;
   a bearing element engageable with a second member; and
   an elastomeric member mounted between said bearing housing and said bearing element.

30. A conformal bearing assembly for an aerodynamic member comprising:
   a bearing housing mounted to a first member;
   a bearing element engageable with a second member, said bearing element conforms to an exterior contour of a rotor blade component; and
   an elastomeric member mounted between said bearing housing and said bearing element.

31. A conformal bearing assembly for a rotor blade comprising:
   a first member comprising a rotor blade section telescopically mountable to a second member comprising a torque tube;
   a bearing housing mounted within said first member;
   an elastomeric member attached to said bearing housing; and
   a bearing element mounted to said elastomeric member such that said bearing element is movable along said second member, said elastomeric member providing a compliant interface between said bearing housing and said bearing element such that said bearing element substantially conforms to said second member.

* * * * *